July 24, 1928.
C. E. NORTH
1,678,477
PROCESS FOR WHIPPING OR AGITATING CREAM
Filed Dec. 4, 1924
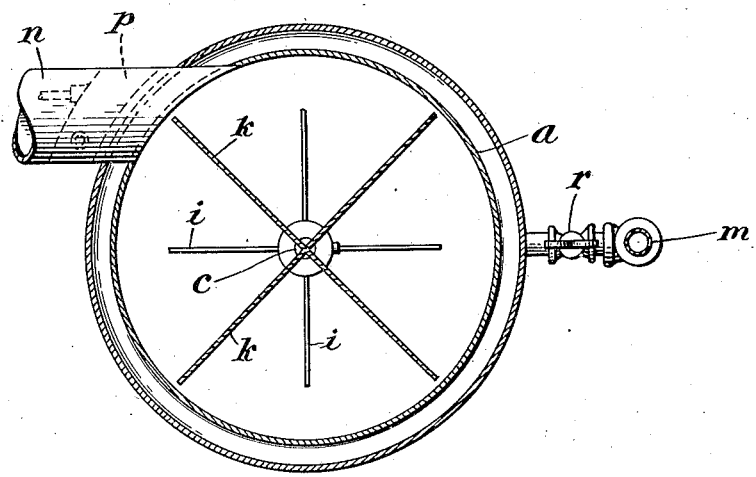
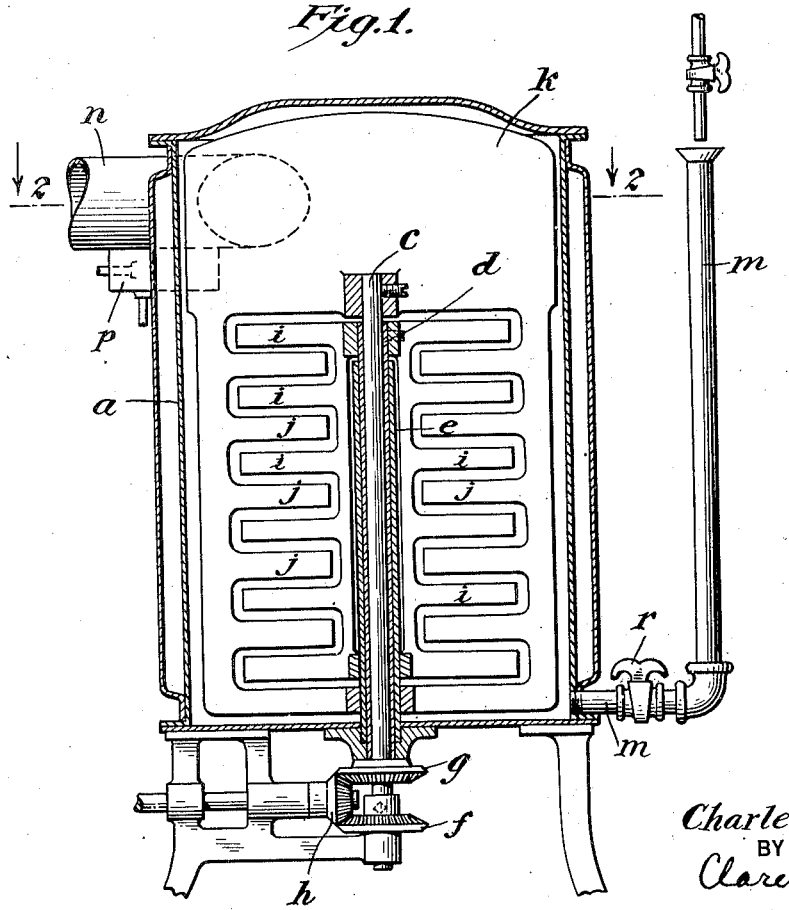
INVENTOR
Charles E. North
BY
Clarence D Kerr
ATTORNEY Patented July 24, 1928.

1,678,477

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS FOR WHIPPING OR AGITATING CREAM.

Application filed December 4, 1924. Serial No. 753,806.

In a patent granted to my assignee on March 4, 1924, No. 1,485,702, I have set forth a combination of apparatus designed for carrying out a process of recovering oil from milk wherein cream is centrifugally separated from the whole milk, washed with water to eliminate more or less of the casein, cooled, agitated, mixed with warm water, and again separated to eliminate the remaining casein and water.

The present process involves a continuous operation, so that a stream of cream is being continuously fed forward to the whipper or agitator at a substantially constant rate. In producing agglomerated cream the whipper or agitator must be adapted and regulated to whip or agitate this cream without churning it into butter and discharge the agglomerated cream into the warm water at a rate corresponding to the feed.

The subject of my present invention is a continuous process of operating a whipper or agitator which will convert a cream into a semi-solid whipped or agglomerated product in the above described process wherein the flow of cream to the whipper or agitator, or the speed of the whipper or agitator, is predetermined, or wherein the rate of flow is varied in accordance with and dependent upon the speed of the whipper or agitator. My invention also comprises a machine for carrying out such process and the resulting product.

In the drawings I have shown a form of whipper by the use of which my process may be practiced.

Fig. 1 is a central vertical section through the whipper.

Fig. 2 is a horizontal cross section on the line 2—2 of Fig. 1.

A container $a$, provided with a removable top $b$, provides a whipping chamber. Extending through the bottom of the chamber is a revoluble shaft $c$ and a revoluble sleeve $d$. Projecting up from the bottom of the container is a stationary exterior bearing or guiding sleeve $e$. The shaft $c$ and sleeve $d$ have secured to them bevel gears $f$ and $g$, respectively, which are engaged by a common driving pinion $h$ and thereby revolved in opposite directions.

Secured to the sleeve $d$ is a frame comprising whipping blades $i$ extending radially outward from near the axis of the shaft and sleeve toward the peripheral wall of the container. Secured to the shaft $e$ is another frame comprising whipping blades $j$ extending from near said peripheral wall toward said axis and a plate or plates $k$ at the upper part of the container above the blades $i$ and $j$.

The two series of blades $i$ and $j$ are arranged alternately. The plates $k$ extend diametrically substantially across the container and vertically from the uppermost whipping blades to the upper end of the container.

A feed pipe $m$ communicates with the bottom of the container. An outlet $n$ for whipped cream opens in the wall of the container just below the top.

Due to the rotation of the two series of whipping blades in opposite directions, the cream entering the container through the inlet $m$ is subjected to a thorough whipping, the globules of cream being beaten back and forth in opposite circumferential directions as they are displaced upwardly by the constantly inflowing stream of cream.

After the whipped cream has been displaced upwardly out of the whipping zone, it is engaged by plates $k$, which function to some degree as ejectors, as they push the whipped cream around to the discharge opening $n$ and facilitate its escape therethrough. The whipped cream is materially increased in consistency above that of the unwhipped cream, and is not in a frothy or fluid condition, but is in the form of a semi-solid mass that has little or no fluidity of substantially the same volume as the original cream. The revolving plates $k$ bring all parts of the whipped cream opposite the orifice $n$ through which it discharges partly by the action of the plates $k$ and partly by reason of the upward and outward pressure of cream that exists throughout the body of the container.

While the whipper, at a given speed of rotation, is perfectly capable of functioning as a butter churn, if the inflow of cream be relatively retarded, it is inefficient to thoroughly whip the cream, if the inflow of cream be relatively accelerated. If the rate of inflow of cream be maintained substantially constant, the contrivance will function to insure the complete conversion of the cream into whipped or agglomerated condition without breaking into butter, provided the speed of rotation of the oppositely moving blades be raised in accordance with the rate of flow. Assuming that the surfaces of the blades remain constant, increasing the speed of rotation of the whipping blades is found to give substantially the same results as increasing the number of the blades and the height of the whipping zone, whereas decreasing the speed of rotation of the whipping blades is the substantial equivalent of a reduction in the number of blades and in the height of whipping zone. However, care must be taken to avoid the over-accumulation of cream in the top of the container, with frequent back pressure of cream. This is avoided by maintaining the rotation of the cream after it leaves the whipping zone so as to facilitate its discharge through the outlet. To prevent the agglomerated cream from clogging the entrance of the outlet $n$, it is sometimes desirable to utilize means to facilitate the movement of the product therethrough. Obviously, any known means for accomplishing such a purpose may be employed. One way of obviating such a difficulty consists in providing a heater $p$ immediately under the outlet $n$ by which the surface of the outlet pipe near its juncture with the cylinder may be heated sufficiently to lubricate the material at this point.

It will be understood that there are operative in the whipper two forces, one tending to throw the cream outward by reason of the centrifugal force created by the rotary blades and the frame $k$, and the other tending to push the cream upward by reason of the pressure of the inflowing cream. As a result of these pressures, it is probable that the column of cream in the container is not solid, but has a more or less hollow core the diameter of which increases toward the top. The operation of these forces insures action upon most or all of the cream in the peripheral zone of the container, where the speed of rotation of the blades and of the ejector plates is relatively high, and also insures the proper ejection of the whipped cream.

In practicing the invention satisfactory results may be secured by passing the separated cream through a cream separator once or more times with a volume of pure water about equal in volume to the skim milk separated by the first passage of the whole milk through a centrifugal separator. By this means the cream is washed, and the proportion of the solids not fat reduced to a very small and inconsequential minimum, although the step is not essential. The cream, whether washed or unwashed, is then caused to flow at a predetermined rate into the closed whipping chamber.

To obtain the most satisfactory results it is desirable either, to vary the size of the inlet opening, as by the valve $r$, to compensate for varying consistencies of the material fed into the container, or to regulate the consistency of the material to correspond to the size of the inlet opening.

It will therefore be seen that my invention relates to the continuous process of introducing cream into a closed container, whipping or agitating the cream therein, and discharging the whipped or agglomerated cream at substantially the same rate at which it is caused to flow in, and to the product produced, which is in a semi-solid or agglomerated condition, as well as the apparatus therefor. My invention is also applicable to the recovery of fats from emulsions of oils with which agglomeration is possible through agitation at temperatures below the melting point of the fat.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The process of whipping cream, which comprises continuously feeding cream to one part of a column of cream and displacing cream in said column, applying to said cream in its movement of displacement rotative impulses in opposite directions, thereby whipping the cream, so correlating the strength and frequency of said impulses to the rate of feed as to thoroughly whip the cream without breaking into butter, displacing whipped cream out of said whipping zone, and after the whipped cream has emerged from the whipping zone displacing it from the column of cream.

2. The process of whipping cream which comprises feeding cream to a container, subjecting the cream to a whipping operation, displacing the cream in whipped condition out of the whipping zone and discharging it at an outlet, and maintaining the rate of feed of cream to insure such displacement after conversion into whipped condition and before breaking into butter.

3. The process of whipping cream which comprises feeding washed cream at a substantially constant and predetermined rate into one part of a container, subjecting the cream to a whipping operation within the container, displacing the cream in whipped condition out of the whipping zone and discharging it out of an outlet as displaced by the inflow of cream.

4. The process of producing a semi-solid or agglomerated cream which comprises agitating a cream in a container into which a given quantity of cream is introduced, and from which the whipped cream is discharged in an agglomerated condition containing substantially no froth before it has broken into butter.

5. The process of producing a semi-solid or agglomerated product which comprises whipping an oleaginous emulsion in a container in which a given quantity of the emulsion is introduced and from which the whipped product is discharged in an agglomerated condition of substantially the same volume as the original emulsion before it has broken into a product having the physical properties of butter.

6. The process of whipping cream, which comprises subjecting the cream to a whipping operation, continuously displacing whipped cream from the whipping zone, feeding additional cream to the whipping zone to replace the same weight of displaced whipped cream, and regulating the rate of feed to insure such displacement after conversion into whipped condition and before breaking into butter.

7. The process of whipping cream which comprises feeding cream to a container, subjecting the cream to a whipping operation, displacing the whipped cream out of the whipping zone by feeding additional cream thereinto and heating the whipped cream to accelerate its discharge.

CHARLES E. NORTH.